United States Patent [19]
Koda et al.

[11] Patent Number: 5,839,561
[45] Date of Patent: Nov. 24, 1998

[54] AUTOMATIC CLUTCH SYSTEM

[75] Inventors: Masanori Koda, Kanagawa; Yoshiyuki Watanabe, Tokyo, both of Japan

[73] Assignee: Unisia Jecs Corporation, Atsugi, Japan

[21] Appl. No.: 842,822

[22] Filed: Apr. 17, 1997

[51] Int. Cl.⁶ .............................. B60K 41/28; F16D 29/00
[52] U.S. Cl. ........................ 192/90; 192/84.6; 192/91 R; 477/74
[58] Field of Search .................. 192/84.6, 90, 91 R, 192/83, 3.56; 477/74

[56] References Cited

U.S. PATENT DOCUMENTS

| | | | |
|---|---|---|---|
| 4,650,056 | 3/1987 | Sevennec et al. | 192/90 |
| 4,852,419 | 8/1989 | Kittel et al. | 192/84.6 X |
| 5,043,895 | 8/1991 | Hattori et al. | 477/75 X |
| 5,094,079 | 3/1992 | Leigh-Monstevens et al. | 192/83 X |
| 5,273,143 | 12/1993 | Voss et al. | 192/83 X |
| 5,678,673 | 10/1997 | Borschert et al. | 192/84.6 |

FOREIGN PATENT DOCUMENTS

4-56184  9/1992  Japan .

Primary Examiner—Rodney H. Bonck
Attorney, Agent, or Firm—Foley & Lardner

[57] ABSTRACT

An automatic clutch system includes an operating cylinder which is interconnected through a release lever with a friction element engaging mechanism. The operating cylinder is communicated with a master cylinder and an auxiliary cylinder through a hydraulic passage. A worm wheel driven by a motor has first and second connecting points which are oppositely disposed with respect to a rotation axis of the worm wheel. The first connecting point is interconnected with a piston rod of the master cylinder and has a first distance from the rotation axis. The second connecting point is interconnecting with a piston rod of the auxiliary cylinder and has a second distance from the rotation axis. The second distance is set smaller than the first distance so that the volume change of the auxiliary cylinder side is smaller than that of the mater cylinder side. Therefore, this cylinder arrangement functions stable to cancel a reaction force of a pressure spring of the friction element engaging mechanism to the worm wheel.

15 Claims, 4 Drawing Sheets

AUTOMATIC CLUTCH SYSTEM

BACKGROUND OF THE INVENTION

The present invention relates to an automatic clutch system which engages and disengages a friction element biased by a spring by means of a motor, and more particularly to an automatic clutch system which is arranged to decrease load applied to a motor by a simple and certain means.

Generally, a clutch unit in a vehicle is constituted such that a clutch disc functioning as a transmission side friction element is disposed between a flywheel and a pressure plate functioning as an engine side friction element. By the engagement of the flywheel and the pressure plate with the clutch disc, motive power of the engine is transferred to the transmission, and by the disengagement of the flywheel and the pressure plate from the clutch disc, the transferring of the motive power to the transmission is cut. The pressure plate is normally pressuringly in contact with the clutch disc by means of a pressure spring such as a diaphragm spring so as to require a force against the force of the pressure spring when the operation for the engagement or disengagement is executed. Recently, automatic clutch systems, which are arranged to execute clutch operation by means of a motor instead of a clutch pedal, have been developed. A typical automatic clutch system includes a controller which controls the motor on the basis of a gear-shift condition, an engine rotation speed, and a vehicle speed so as to smoothly engage or disengage the clutch. However, since this automatic clutch system is arranged to drive the motor against the force of the spring force applying the pressuring direction to the pressure plate, the load applied to the motor becomes large. This raises a difficulty in obtaining a stable clutch operation. In order to solve the above-mentioned problem, a Japanese Patent Provisional Publication No. 4-56184 has proposed an automatic clutch system in which a motor is engaged with a release lever for operating a friction element through a gear unit. An assist spring of a coil spring is installed to one gear of the gear unit so as to be set against the force of the pressure spring which biases the friction element. Although this automatic clutch system is arranged to keep the load of the motor small and constant by canceling the pressure spring by the assist spring, the force of the assist spring prevents the pressuring function of the pressure spring to the friction element in case that the force of the assist spring is operating in a clutch engaged condition. Therefore, the connecting point of the assist spring is set at a specific point so that the force of the assist spring is not applied to the pressure spring during the clutch connecting condition.

However, this conventional automatic clutch system requires to install a large-force assist spring in the gear unit and to adjust a connecting point of the assist spring to the gear with high accuracy so as not to function the force of the assist spring in the clutch engaged condition. These requirements increase a size of the automatic clutch system and require a highly difficult work in assembling operation of the assist spring and in adjustable setting thereof. Further, since this conventional automatic clutch system is arranged to cancel the force of the pressure spring by the coil-type assist spring, the application of a diaphragm spring as the pressure spring degrades the stable canceling of the force of the pressure spring in the whole clutch stoke range due to the characteristics of the applied spring. That is, this application of the diaphragm spring as the pressure spring invites a large deviation of the load applied to the motor in the clutch stroke range and unstable clutch operation in this conventional system.

SUMMARY OF THE INVENTION

It is an object of the present invention to provide an improved automatic clutch system which enables a simple and compact design and a simple structure without requiring complicated assembling operation and adjusting operation so as to keep the load of a motor small in whole clutch stroke range.

An automatic clutch system according to the present invention is applied for controlling engagement and disengagement between an engine and a transmission in a vehicle. The automatic clutch system comprises a first friction element of the engine and a second friction element of the transmission. A spring biases the first friction element so as to establish the engagement between the first and second friction elements. An operating cylinder is interconnected with the first friction element and is operated to disengage the first friction element from the second friction element by receiving hydraulic oil. A master cylinder is fluidly communicated with the operating cylinder. An auxiliary cylinder is disposed parallel with the master cylinder and is fluidly communicated with the operating cylinder. A rotor driven by a motor includes first and second connecting points which are oppositely disposed with respect to a rotation axis of the rotor. The first connecting point is interconnected with the master cylinder, and the second connecting point is interconnected with the auxiliary cylinder. A distance between the second connecting point and the rotation axis is smaller than a distance between the first connecting point and the rotation axis.

DETAILED DESCRIPTION OF THE INVENTION

Referring to FIGS. 1 to 4, there is shown an embodiment of an automatic clutch system 1 installed between an engine and a transmission of a vehicle in accordance with the present invention.

Figure 1:
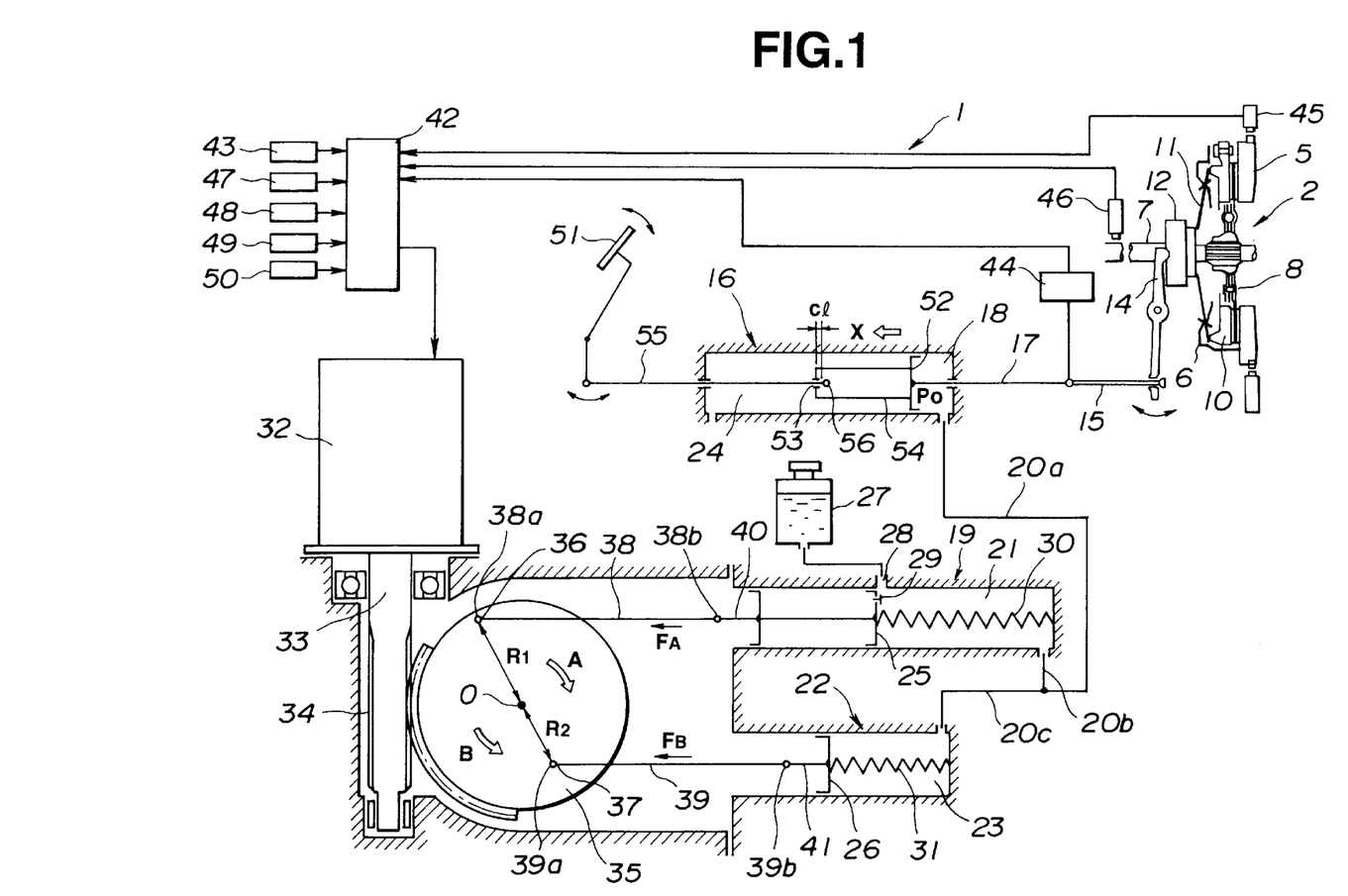
FIG. 1 is a schematic view of an embodiment of an automatic clutch according to the present invention.

The automatic clutch system 1 comprises a clutch body 2 at which the engagement and the disengagement between the engine and the transmission are executed. The clutch body 2 includes a fly wheel 5 which is connected to a crankshaft of the engine and a clutch disc 8 which is splined with an input shaft 7 of the transmission. A disc portion of the clutch disc 8 is disposed between the flywheel 5 and a pressure plate 10. The pressure plate 10 is biased in the direction toward the flywheel 5 by a diaphragm spring 11 so that the clutch disc 8 is pressuredly sandwiched by the flywheel 5 and the pressure plate 10. A clutch cover 6 is connected to the flywheel 5 so as to cover the clutch disc 8, the pressure plate 10 and the diaphragm spring 11. Further, the clutch cover 6 supports an intermediate portion of the diaphragm spring 11. An inner periphery of the diaphragm spring 11 is in contact with a release bearing 12 which is slidable and rotatable on the input shaft 7 of the transmission. The slide movement of the release bearing 12 pushes the inner periphery of the diaphragm spring 11 and therefore the outer periphery of the diaphragm spring 11 is moved to decrease the pushing to the pressure plate 10. That is, by the sliding movement of the release bearing 12 toward the spring diaphragm 11, the engagement between the flywheel 5 of the engine and the input shaft 7 of the transmission is released or cancelled. An end portion of a release lever 14 is in contact with the release bearing 12, and the other end portion of the release lever 14 is interconnected with an end portion of a wire 15. A generally center portion of the release lever 14 is supported to a not-shown clutch housing so that the release lever 14 is swingable on the supported center portion.

The clutch body 2 is normally set such that the diaphragm spring 11 pushes the pressure plate 10 to the clutch disc 8 so as to enable the power transferring from the crankshaft to the input shaft 7. Hereinafter, this engaged condition between the engine and the transmission is called as clutch engagement. By the sliding operation of the release bearing 12 toward the diaphragm spring 11, the diaphragm spring 11 cancels the pushing to the pressure plate 10 so as to disengage the flywheel 4 of the engine from the input shaft 7 of the transmission. Hereinafter, this disengaged condition of the clutch body 2 is called as clutch disengagement. In this embodiment, the flywheel 5 and pressure plate 10 constitute an input side friction element, and the clutch disc 8 constitutes an output side friction element.

An end portion of the wire 15 interconnected with the other end portion (base end) of the release lever 14 functions as an operation part of the friction element (pressure plate 10). The other end portion of the wire 15 is connected with a piston rod 17 of the operating cylinder 15. An operation chamber 18 of the operating cylinder 16 receives hydraulic oil supplied from a master cylinder 19 so that the release lever 14 is dislocated in the clutch disengagement direction by the movement of the piston rod 17 in the backward direction according to the receiving the hydraulic oil. A hydraulic passage 20a of the operating cylinder 16 is branched into first and second branch hydraulic passages 20b and 20c. The first branch hydraulic passage 20b is communicated with an operation chamber 21 of the master cylinder 19, and the second branch hydraulic passage 20c is communicated with an operation chamber 23 of an auxiliary cylinder 22 parallel with the master cylinder 19. A back chamber 24 of the operating cylinder 16 is communicated with the atmosphere.

Each of the master cylinder 19 and the auxiliary cylinder 22 is basically constituted so as to move reciprocally according the force applied to each piston 25, 26. A pressure receiving area of the piston 25 of the master cylinder is formed as same as that of the piston 26 of the auxiliary cylinder 22. The piston 25 of the master cylinder 19 has a tandem structure for sealing a port 28 communicated with the reservoir 27. In other words, the operation chamber 18 is defined by the operating cylinder 16 and the piston 52 which is reciprocatedly movable in the operating cylinder 16. The operation chamber 21 is defined by the master cylinder 19 and the piston 25 which is reciprocatedly movable in the master cylinder 19. The operation chamber 23 is defined by the auxiliary cylinder 22 and the piston 26 which is reciprocatedly movable in the auxiliary cylinder 22. The master cylinder 19 is provided with a reservoir 27 for storing the hydraulic oil.

A check valve 29, which opens when the piston 25 is moved toward the expansion direction of the master cylinder 19, is installed to the piston 25. Springs 30 and 31 generating small spring force are disposed in the operation chambers 21 and 23, respectively, so as to decrease the inertia force of the respective pistons 25 and 26 in their operation.

On the other hand, an electric motor 32 for driving a clutch body 2 comprises a motor shaft 33 having a worm gear 34. The worm gear 34 is engaged with a worm wheel 35 constituting a rotor. On the worm wheel 35, connecting points 36 and 37 are formed at positions which are oppositely disposed with respect to a rotation center (or rotation axis) O of the worm wheel 35. The connecting point 36 is connected with the piston rod 40 through a connecting rod 38, and the connecting point 37 is connected with the piston rod 41 through a connecting rod 39. Both ends 38a and 38b of the connecting rod 40 are rotatably interconnected with the connecting point 36 and the piston rod 40 of the master cylinder 19, respectively, and both ends 39a and 39b of the connecting rod 41 are rotatably interconnected with the connecting point 37 and the piston rod 41 of the auxiliary cylinder 22, respectively.

A connecting point distance $R_1$ from the rotation center O of the worm wheel 35 to the connecting point 36 for the master cylinder 19 is set greater than a connecting point distance R2 from the rotation center O of the worm wheel 35 to the connecting point 37 for the auxiliary cylinder 22. Therefore, the displacement amount of the piston 25 caused by the rotation of the worm wheel 35 becomes greater than the displacement amount of the piston 26 caused by the rotation of the worm wheel 35. The volume change of the operation chamber 21 of the master cylinder 19 becomes greater than the volume change of the operation chamber 23 of the auxiliary cylinder 19.

A controller 42 for controlling the motor 32 is electrically connected with the motor 32. The controller 42 is connected to various sensors such as a shift lever switch 43, a stroke sensor 44, an input rotation speed sensor 45, an output rotation speed sensor 46, a vehicle speed sensor 47, a gear position sensor 48, a throttle opening degree sensor 49, and a brake switch 50. The controller 42 receives various signals from the various sensors 43 to 50 and controls the rotational direction and the rotation angle of the motor 32 so as to smoothly execute the disengagement and the engagement of the automatic clutch system. The shift lever switch 43 is turned on when the clutch disengagement command from a driver is inputted and which is turned off when the clutch engagement command from the driver is inputted. The stroke sensor 44 is installed at the end of the wire 15 and detects a stroke amount of an operating cylinder 16. The input rotation speed sensor 45 is disposed in the vicinity of the outer periphery of the flywheel 5 and detects a rotation speed of a clutch input side (the rotation speed of the flywheel 5). The output rotation speed sensor 46 is disposed in the vicinity of the input shaft 7 and detects a rotation speed of a clutch output side (a rotation speed of the input shaft 7 of the transmission). The gear position 48 is installed in the vicinity of the transmission and is arranged to inform a present gear position of the transmission and to detect that the gear shift of the transmission is accomplished. The throttle opening degree sensor 49 is arranged to detect an opening degree of the throttle of the engine. The brake switch 50 is arranged to output an ON signal to the controller 42 when a brake system is operated.

Basically, the release lever 14 is operated by the motor 32 controlled by the controller 42. In addition, the automatic clutch system is arranged such that a vehicle driver can manually execute the engagement and the disengagement of the clutch mechanism through the clutch pedal 51 for the purpose of fail-safe and the like. More particularly, a holder 54 including a connecting hole 53 is installed to a piston 52 of the operating cylinder 16. An arm end of the clutch pedal 51 is connected to an end of a clutch wire 55. The other end of the clutch wire 55 is interconnected with the holder 54 through a clump 56 connectable with a periphery defining the connecting hole 53 so as to slide the holder 54 when the clutch pedal 51 is depressed. That is, when the motor 32 is not operated or when clutch pedal 51 is not depressed, a clearance Cl is formed (ensured) between the clump 56 and the periphery for defining the connecting hole 53.

The manner of operation of the automatic clutch system according to the present invention will be discussed hereinafter.

When the driver grips the shift lever for executing a start of the vehicle or shift change, the gear shift lever switch 43 outputs the ON signal indicative of the clutch disengagement to the controller 42. The controller 42 controls the motor 32 so as to rotate it in the clutch disengagement direction in reply to the ON signal from the gear shift lever switch 43. By the disengagement directional rotation of the motor 32, the worm wheel 35 is rotated in the direction shown by an arrow A in FIG. 1 to displace the piston 25 of the master cylinder 19 and the piston 26 of the auxiliary cylinder 22. Therefore, the hydraulic oil is discharged from the master cylinder 19 through the first branch hydraulic passage 20b, and part of the discharged hydraulic oil is led in the operation chamber 23 of the auxiliary cylinder 22 through the second branch hydraulic passage 20c. The volume changes of the master cylinder 19 and the auxiliary cylinder 22 according to the rotation of the worm wheel 35 are determined according to the connecting point distances $R_1$ and $R_2$ on the worm wheel 35. That is, the connecting point distances $R_1$ and $R_2$ are set such that the distance of the auxiliary cylinder 22 side is smaller than that of the master cylinder 19 side. Therefore, the hydraulic oil is fed from the master cylinder 19 to the auxiliary cylinder 22, and the excess of the hydraulic oil from the master cylinder 19 is fed to the operation chamber 18 of the operating cylinder 16 through the hydraulic passage 20a.

Figure 2:
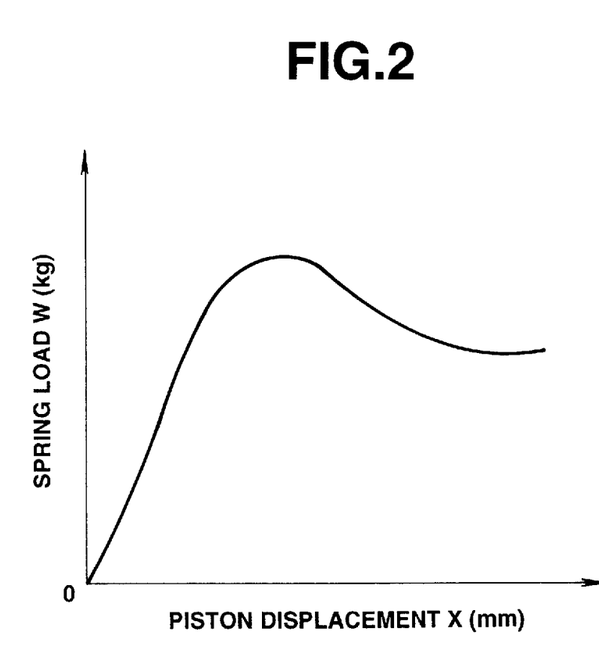
FIG. 2 is a graph which shows a relationship between spring load and piston displacement applied to the embodiment of FIG. 1.
Figure 3:
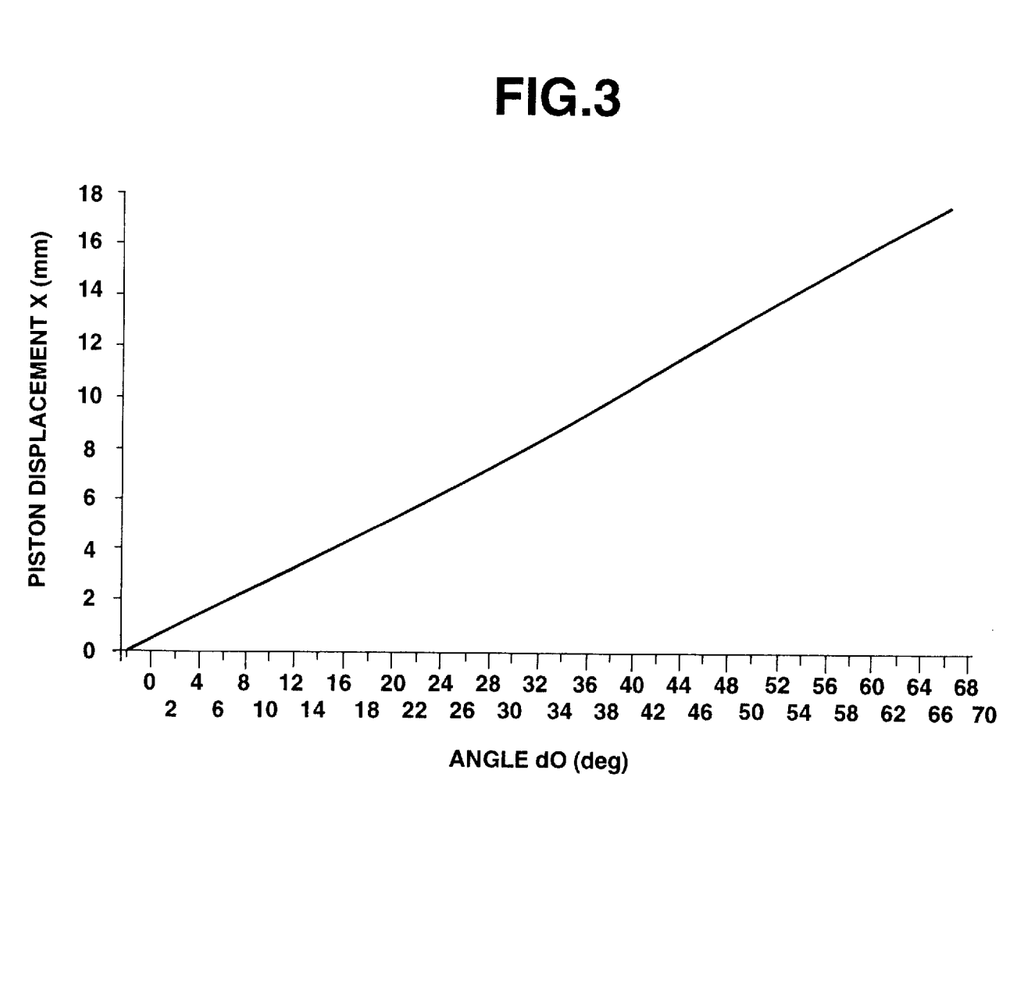
FIG. 3 is a graph which shows a relationship between piston displacement and rotor angle applied to the embodiment of FIG. 1.
Figure 4:
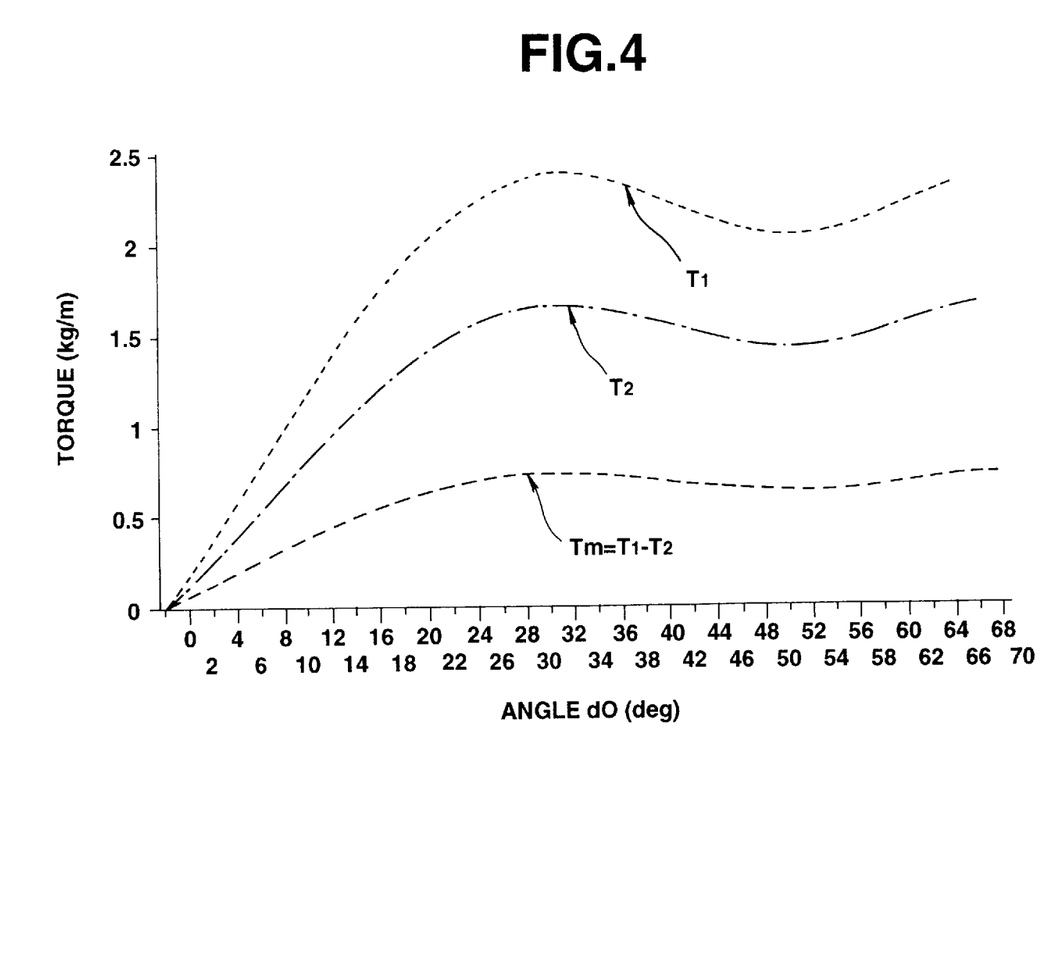
FIG. 4 is a graph which shows a relationship between torque and rotor angle applied to the embodiment of FIG. 1.

By this operation, the piston 52 of the operating cylinder 16 is dislocated in the direction of arrow X in FIG. 1 by the hydraulic oil flowed into the operating cylinder 16, and the release lever 14 is swung through the wire 15. As a result, the reaction force of the diaphragm spring 11 is applied to the piston 52 of the operating cylinder 16 through the release bearing 12, the release lever 14 and the wire 15 so that the pressure $P_0$ according to this reaction force is generated in the respective operation chambers 18, 21 and 23 and the hydraulic passages 20a, 20b and 20c. Consequently, the forces $F_A$ and $F_B$ which are respectively determined by the multiple of the pressure $P_0$ and the respective pressure receiving areas of the respective pistons 25 and 26. Therefore, if it is assumed that there is no auxiliary cylinder 22, the motor 32 must rotates the worm wheel 35 by generating the torque $T_1$ which is generally the same as the multiple of the force $F_A$ and the connecting distance $R_1$. Practically, the auxiliary cylinder 22 is provided in the automatic clutch system 1 and applies a torque $T_2$, which is generally the same as the multiple of the force $F_B$ and the connecting distance $R_2$ to the worm wheel 35 in the worm wheel rotated direction. The torque $T_2$ functions as an assist force of the motor 32 so as to decrease a required torque $T_m$ of the motor 32. That is, the required torque $T_m$ of the motor 32 may be the difference between the torque $T_1$ from the master cylinder 19 and the torque $T_2$ from the auxiliary cylinder 22. Since the torque $T_2$ functioning as an assist force is proportion to the reaction force of the diaphragm spring 11, by the increase of the reaction force (spring load) of the diaphragm spring 11 according to the displacement of the piston 52 of the operating cylinder 16 as shown in FIG. 2, the torque $T_2$ is increased according to the increase of this displacement of the piston 52 so as to largely cancel the reaction force of the diaphragm spring 11. Therefore, the required torque (load) of the motor 32 becomes very small and generally constant in the clutch stroke range, as shown in FIGS. 3 and 4.

After this disengagement of the clutch body 2, the controller 42 detects the achievement of the gear shift and outputs an engagement signal to the motor 32 in order to displace the clutch in the engagement direction. The output signal is always determined on the basis of the information such as the gear position and the engine rotation speed (input side rotation speed) so as to obtain the rotation angle and the speed of the motor which are preferable to smoothly engage the clutch.

By inputting the output signal to the motor 32, the motor 32 is rotated in the reverse direction, and the worm wheel 35 is rotated in the direction shown by an arrow B in FIG. 1 according to the reverse rotation of the motor 32. By the reverse rotation of the worm wheel 35, the volume of the operation chamber 21 of the master cylinder 19 is increased so that the hydraulic oil of the operation chambers 23 and 18 of the auxiliary cylinder 22 and the operating cylinder 16 is returned to the operation chamber 21 of the master cylinder 19. However, the pressure $P_0$ according to the reaction force of the diaphragm spring 11 is generated in the respective operation chambers 18, 21 and 23 and the hydraulic passages 20a, 20b and 20c, the worm wheel 35 receives the rotation torque $T_1$ and $T_2$ from the master cylinder 19 and the auxiliary cylinder 22 as is similar to the case of the clutch disengagement. Therefore, the rotational torque $T_2$ from the auxiliary cylinder 22 functions to cancel the reaction force of the diaphragm spring 11. As a result, the required torque (load) of the motor 32 becomes very small in the clutch stroke range.

In case that the driver executes the engagement or disengagement of the clutch by depressing the clutch pedal 51, the piston 52 of the operating cylinder 16 is directly controlled without using the hydraulic. The flowing of the hydraulic oil during this operation of the piston 52 is executed between the operation chamber 18 of the operating cylinder 16 and the reservoir 27 of the master cylinder 19 through the hydraulic passages 20a and 20b.

With the thus arranged automatic clutch system, when the motor 32 is driven, the rotation torque corresponding to the reaction force of the spring biasing the friction element is applied to the rotor from the auxiliary cylinder so as to cancel the reaction force. As a result, it becomes possible to design the system simple and compact. Further it becomes possible to keep the load of a motor small in whole clutch stroke range by a simple structure without requiring complicated assembling operation and adjusting operation.

Although the preferred embodiment of the present invention has been shown and described such that the motive power of the motor 32 is transferred through the worm gear 34 and the worm wheel 35 to the master cylinder 19 and the auxiliary cylinder 22, it will be understood that the invention is not limited to this disclosure and may be arranged such that the motive power of the motor 22 may be transferred to the both cylinders 19 and 22 by means of other mechanism.

While the preferred embodiment of the present invention has been shown and described such that the pressure receiving area of the piston 25 of the master cylinder 19 is the same as that of the piston 26 of the auxiliary cylinder 22, it will be understood that the pressure receiving area of the piston 26 of the auxiliary cylinder 22 may be set to be greater than that of the piston 25 of the master cylinder 19 as far as the volume change of the auxiliary cylinder 22 according to the worm wheel 35 is smaller than that of the master cylinder 19.

The entire disclosure of Japanese Patent Application No. 8-94980 filed on Apr. 17, 1996 including specification, claims, drawings and summary are incorporated herein by reference in its entirety.

What is claimed is:

1. An automatic clutch system for controlling engagement and disengagement between an engine and a transmission in a vehicle, said automatic clutch system comprising:

a first friction element of the engine;

a second friction element of the transmission;

a spring biasing said first friction element so as to establish the engagement between said first and second friction elements;

an operating cylinder interconnected with said first friction element, said operating cylinder being operated to disengage said first friction element from said second friction element by receiving hydraulic oil;

a master cylinder fluidly communicated with said operating cylinder;

an auxiliary cylinder disposed parallel with said master cylinder and fluidly communicated with said operating cylinder; and a rotor driven by a motor, said rotor including first and second connecting points which are oppositely disposed with respect to a rotation axis of said rotor, the first connecting point being interconnected with said master cylinder and the second connecting point being interconnected with said auxiliary cylinder, a distance between the second connecting point and the rotation axis being smaller than a distance between the first connecting point and the rotation axis.

2. An automatic clutch system as claimed in claim 1, wherein said master cylinder includes a master cylinder operation chamber, a master cylinder piston and a master cylinder piston rod interconnecting the master cylinder piston and the first connecting point, and said auxiliary cylinder includes an auxiliary cylinder operation chamber, an auxiliary cylinder piston and an auxiliary cylinder piston rod interconnecting the auxiliary cylinder piston and the second connecting point.

3. An automatic clutch system as claimed in claim 2, wherein the master cylinder piston rod is rotatably interconnected with the first connecting point through a first connecting rod, and the auxiliary cylinder piston rod is rotatably interconnected with the second connecting point through a second connecting rod.

4. An automatic clutch system as claimed in claim 1, wherein said rotor is constituted by a worm wheel which is engaged with a worm gear rotated by the motor of an electromotive type.

5. An automatic clutch system as claimed in claim 1, wherein said operating cylinder includes an operating cylinder operation chamber and an operating cylinder piston which is interconnected with a clutch pedal of the vehicle, the operating cylinder operation chamber being communicated with the master cylinder operation chamber and the auxiliary operation chamber through a hydraulic passage.

6. An automatic clutch system as claimed in claim 5, wherein the operating cylinder operation chamber, the mater cylinder operation chamber, the auxiliary operation chamber and the hydraulic passage are filled with hydraulic oil.

7. An automatic clutch system as claimed in claim 2, wherein the hydraulic passage is branched into a first branch hydraulic passage communicated with the master cylinder operation chamber and a second branch hydraulic passage communicated with the auxiliary cylinder operation chamber.

8. An automatic clutch system as claimed in claim 2, wherein a master cylinder spring is disposed in the master cylinder operation chamber, and an auxiliary cylinder spring is disposed in the auxiliary cylinder operation chamber.

9. An automatic clutch system as claimed in claim 1, wherein said master cylinder is provided with a reservoir for storing hydraulic oil.

10. An automatic clutch system as claimed in claim 2, wherein the master cylinder piston is formed into a tandem structure and has a check valve which opens when the master cylinder piston is moved toward an expansion direction of said master cylinder.

11. An automatic clutch system as claimed in claim 2, wherein a pressure receiving area of the master cylinder piston is the same as that of the auxiliary cylinder piston.

12. An automatic clutch system as claimed in claim 1, further comprising a controller which outputs a control signal to the electric motor for driving said rotor according to vehicle information.

13. An automatic clutch system as claimed in claim 12, wherein the controller is connected to a shift lever switch, an operation cylinder stroke sensor, a an input rotation speed sensor, an output rotation speed sensor, a vehicle speed sensor, a gear position sensor, a throttle opening degree sensor, and a brake sensor, the controller obtaining the vehicle information therefrom.

14. An automatic clutch system as claimed in claim 2, wherein the volume change of the master cylinder operation chamber is greater than that of the auxiliary cylinder operation chamber when said rotor is rotated.

15. An automatic clutch system for controlling engagement and disengagement between an engine and a transmission in a vehicle, said automatic clutch system comprising:

a first friction element connected to an output shaft of the engine;

a second friction element connected to an input shaft of the transmission;

a spring biasing said first friction element so as to establish the engagement between said first and second friction elements;

an operating-cylinder operation chamber defined by an operating cylinder and an operating-cylinder piston which is reciprocatedly movable in the operating cylinder, the operating-cylinder piston interconnected with said spring;

a master-cylinder operation chamber defined by a master cylinder and a master-cylinder piston which is reciprocatedly movable in the master cylinder by communicated with said operating cylinder, said master-cylinder operation chamber being filled with hydraulic oil and being communicated with said operating-cylinder operation chamber;

an auxiliary-cylinder operation chamber defined by an auxiliary cylinder and an auxiliary-cylinder piston which is reciprocatedly movable in the auxiliary cylinder, said auxiliary-cylinder operation chamber being filled with hydraulic oil and being communicated with said operating-cylinder operation chamber; and a rotor driven by an electric motor, said rotor including first and second connecting points which are oppositely disposed with respect to a rotation axis of said rotor, the first connecting point being interconnected with the master-cylinder piston and the second connecting point being interconnected with the auxiliary-cylinder piston, a distance between the second connecting point and the rotation axis being smaller than a distance between the first connecting point and the rotation axis.

* * * * *

UNITED STATES PATENT AND TRADEMARK OFFICE
CERTIFICATE OF CORRECTION

PATENT NO. :   5,839,561
DATED      :   November 24, 1998
INVENTOR(S) :  Masanori KODA et al.

It is certified that error appears in the above-indentified patent and that said Letters Patent is hereby corrected as shown below:

On the title page, insert
--[30]     Foreign Application Priority Data
    April 17, 1996,   [JP]   Japan ........... 8-094980--.

Signed and Sealed this

Twenty-fifth Day of May, 1999

*Attest:*

Q. TODD DICKINSON

*Attesting Officer*      *Acting Commissioner of Patents and Trademarks*